United States Patent [19]

Siegenthaler

[11] Patent Number: 5,188,846
[45] Date of Patent: Feb. 23, 1993

[54] TIRE INNERSTITCHING MOLD

[75] Inventor: Karl J. Siegenthaler, Roma-Ostia, Italy

[73] Assignee: Bridgestone/Firestone, Inc., Akron, Ohio

[21] Appl. No.: 832,112

[22] Filed: Feb. 6, 1992

[30] Foreign Application Priority Data

Mar. 26, 1991 [IT] Italy .................. T901A 000213

[51] Int. Cl.⁵ .............................................. B29B 9/00
[52] U.S. Cl. ................................... 425/11; 156/451; 156/421.6
[58] Field of Search ........... 156/408, 413, 421, 451.6; 425/11, 26, 87, 517

[56] References Cited

U.S. PATENT DOCUMENTS

| | | |
|---|---|---|
| 2,717,022 | 9/1955 | Duerksen ............... 156/404 X |
| 2,808,872 | 10/1957 | Clapp . |
| 3,695,808 | 10/1972 | Beneze . |
| 3,962,987 | 6/1976 | Brandl . |
| 4,083,672 | 4/1978 | Vaishnav . |
| 4,262,624 | 4/1981 | Soeda et al. . |
| 4,398,492 | 8/1983 | Casey . |

FOREIGN PATENT DOCUMENTS 0466200 10/1975 Australia .
1539471 9/1968 France .
45-28499 9/1970 Japan .
1060673 3/1967 United Kingdom .

*Primary Examiner*—Charles Hart
*Attorney, Agent, or Firm*—Ernst H. Ruf

[57] ABSTRACT

A tire innerstitching mold (9) defined by an inner portion (18) (19) of the grab ring (16) (54) of an outer tread belt (3), wherein the grab ring (16) (54) presents an inner annular body (18) (19) and two annular shoulders (51) located on opposite sides of the inner annular body (18) (19) so as to define, with the inner annular body (18) (19), a concave annular surface (9a) negatively matching the outer shoulder (53) and tread surface (2a) of a smooth-tread tire (2); at least one of the two annular shoulders (51) being movable in relation to the inner annular body (18) (19).

8 Claims, 4 Drawing Sheets

TIRE INNERSTITCHING MOLD

TECHNICAL FIELD

The present invention relates to a tire innerstitching mold.

BACKGROUND OF THE ART

Co-pending Italian Patent Application No. T091A000211, filed concurrently herewith by the Assignee of the present invention and which is incorporated herein in the interest of full disclosure, relates to a method and device for joining stratified or layered tire portions or components by means of an innerstitching operation, during which, the inner carcass of a green tire and the outer tread belt are assembled together inside a fixed stitching mold by rotating stitching devices over the inner surface of the carcass. The stitching devices push the carcass radially outwardly so as to adhere perfectly to the tread belt or ply, which in turn is pushed or reacts against the inner surface of the stitching mold in contact therewith thereby accurately forming the finished green tire.

SUMMARY OF THE INVENTION

It is an object of the present invention to provide a tire innerstitching mold which, with relatively low-cost modifications, may also be employed on existing tire building machines. According to the present invention, there is provided a tire innerstitching mold, characterized by the fact that it includes an annular gripping body for receiving and retaining an outer tread belt; with two annular shoulders located on opposite sides of said annular gripping body and defining, with same, a concave annular stitching surface negatively matching the outer shoulder and tread surface of a finished smooth-tread tire; at least one of said two annular shoulders being movable in relation to said annular gripping body.

Said annular gripping body and said annular shoulders preferably constitute an inner portion of a grab ring for transferring said outer tread belt to a carcass building drum and removing a finished green tire from said drum.

BRIEF DESCRIPTION OF THE DRAWINGS

A number of non-limiting embodiments of the present invention will be described by way of example with reference to the accompanying drawings, in which.

BEST MODE FOR CARRYING OUT THE INVENTION

Figure 1:
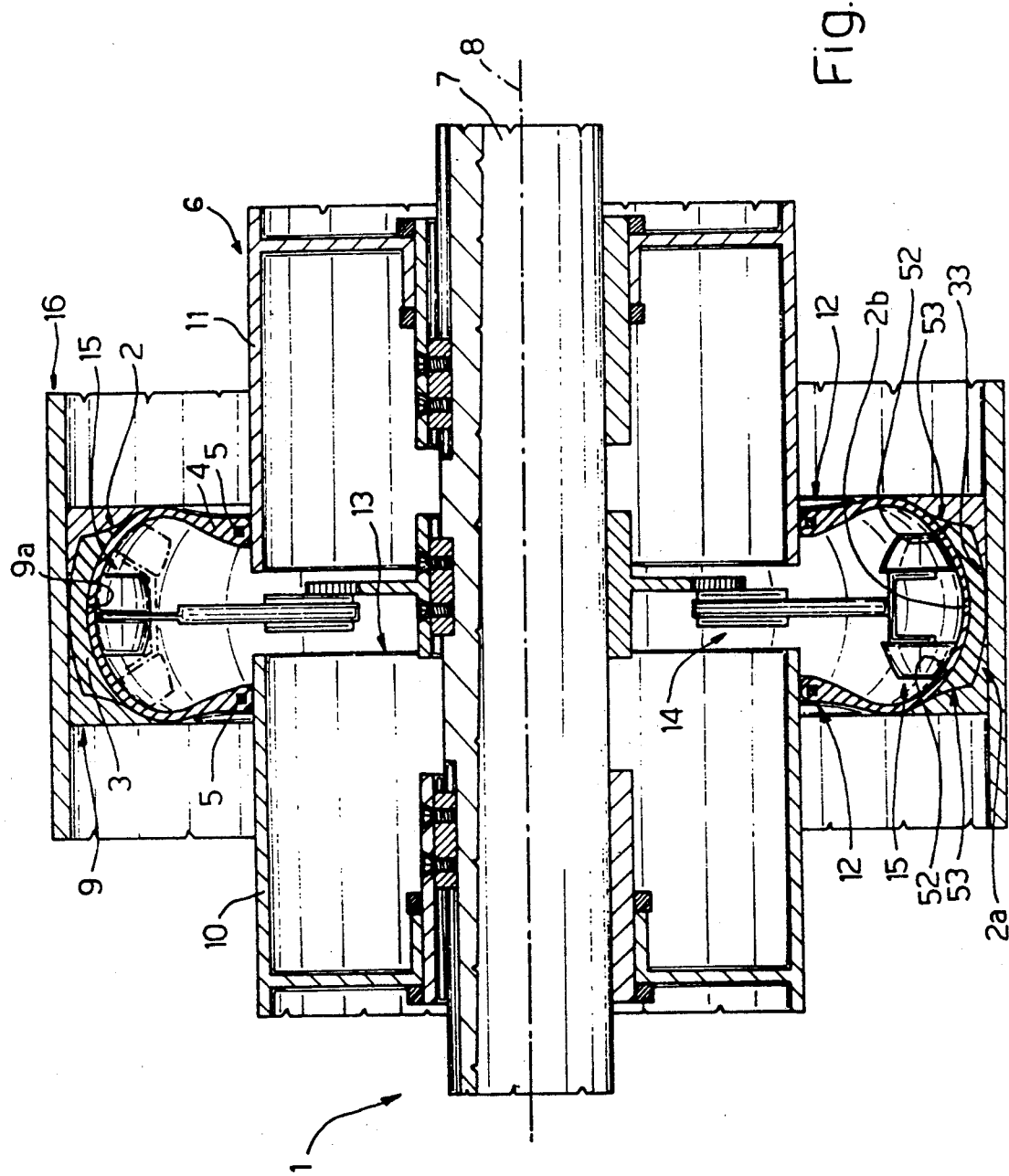
FIG. 1 shows a schematic axial cross section of a tire building unit featuring a stitching mold in accordance with the teachings of the present invention.

Number 1 in FIG. 1 indicates a unit for building a green tire 2 comprising a tread belt 3, an inner carcass 4 with two metal beads 5, and having an outer tread and shoulder surface 2a.

Unit 1 includes a tire building device consisting of a tire building drum 6 extending through the inner diameter of tire 2 and in turn including a hollow, driven inner shaft 7 rotating about an axis 8 coincident with the axis of rotation of tire 2; and a stitching mold 9 open along its inner surface and located outside drum 6 and coaxial with axis 8.

Drum 6 is defined by two coaxial half drums 10 and 11 facing respective bead portions 12 of tire 2 and defining an annular opening 13 located centrally, in use, between bead portions 12 of tire 2 housed inside mold 9. A detailed description of building drum 6 is provided in co-pending Italian Patent Application No. T091A000212 filed concurrently herewith by the Assignee of the invention and which is incorporated herein in the interest of full disclosure.

Unit 1 also includes an innerstitching device 14, forming a portion of drum 6, supported on an intermediate portion of shaft 7, and having a number of stitching elements 15 (only two of which are shown in FIG. 1) moving radially, in relation to shaft 7, between a withdrawn idle position wherein elements 15 are located inside drum 6, and an extracted operating position wherein elements 15 engage the inner surface 2b of carcass 4 of tire 2. Stitching device 14 is the object of previously noted Italian Patent Application No. T091A000211.

Figure 2:
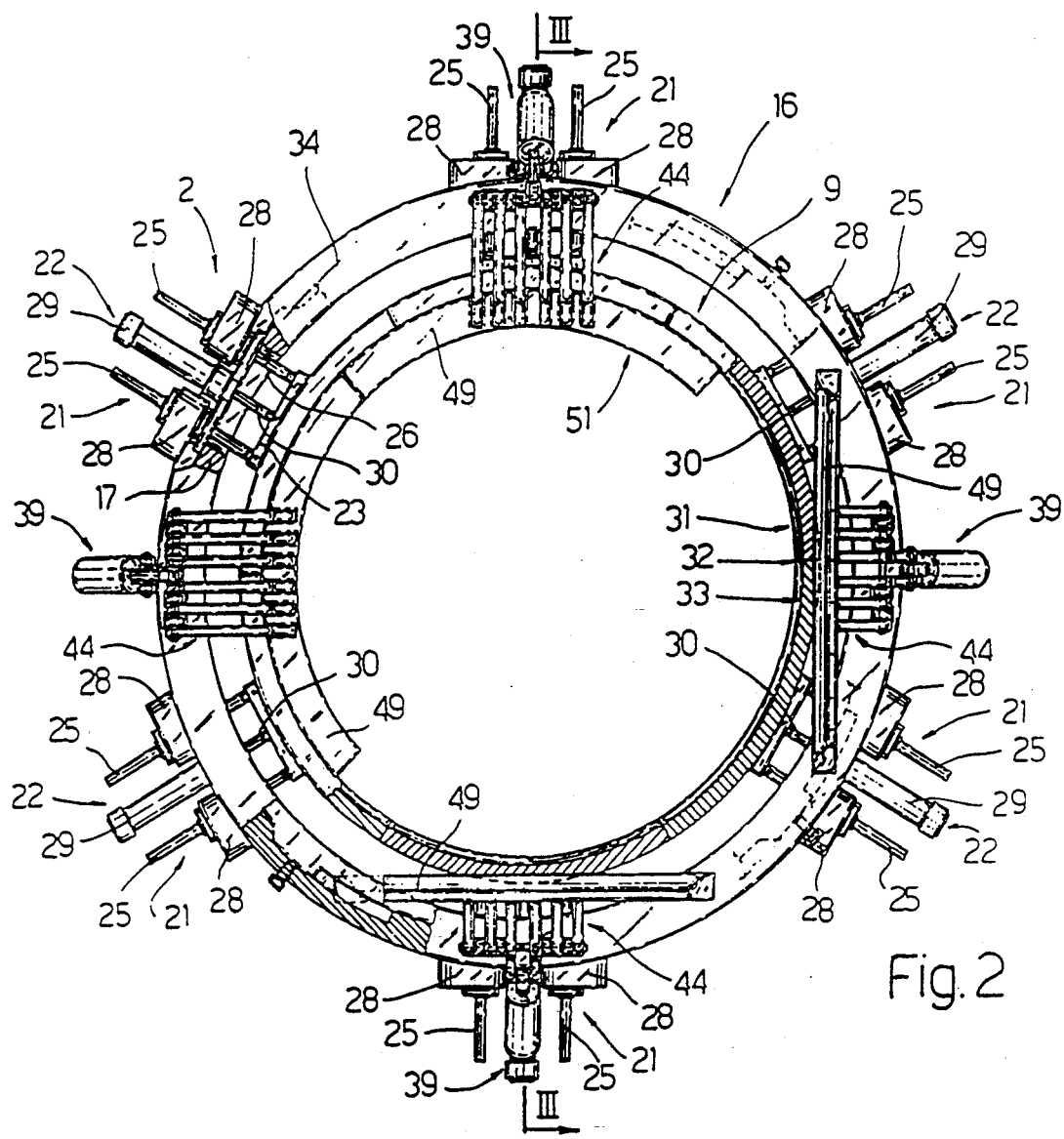
FIG. 2 shows a side view of a first preferred embodiment of a tire grab ring incorporating the FIG. 1 stitching mold.

As shown in FIG. 2, stitching mold 9 forms an inner portion of a grab ring 16 including an outer annular body 17, and an inner annular body 18 (FIG. 3) coaxial with outer annular body 17 and defined by a number of sectors 20. For each sector 20, grab ring 16 also includes a connecting and guide device 21 connected to sector 20 for connecting it to outer annular body 17 and guiding it, in relation to outer annular body 17, along a radial path as it is moved, by a linear pneumatic actuator 22 on outer annular body 17, between an outer idle position (not shown) wherein the facing ends of each pair of adjacent sectors 20 are parted, and an inner grab position wherein said facing ends are arranged substantially contacting each other.

As shown in FIG. 2, each device 21 includes a plate 23 connected integrally with a central portion of the outer surface 24 (FIG. 3) of respective sector 20; and two rods 25 integrally with and extending substantially radially outwardly from plate 23, and engaging in a sliding manner, a respective through slot 26 formed radially through outer annular body 17 and closed by a plate 27. Plate 27 has rods 25 fitted therethrough, and supports a friction guide element 28 for sliding engagement by each rod 25. Plate 27 also supports the body 29 of actuator 22, the output rod 30 of which extends radially inwardly through plate 27 and is connected on its inner end to the outer surface of plate 23.

Figure 3:
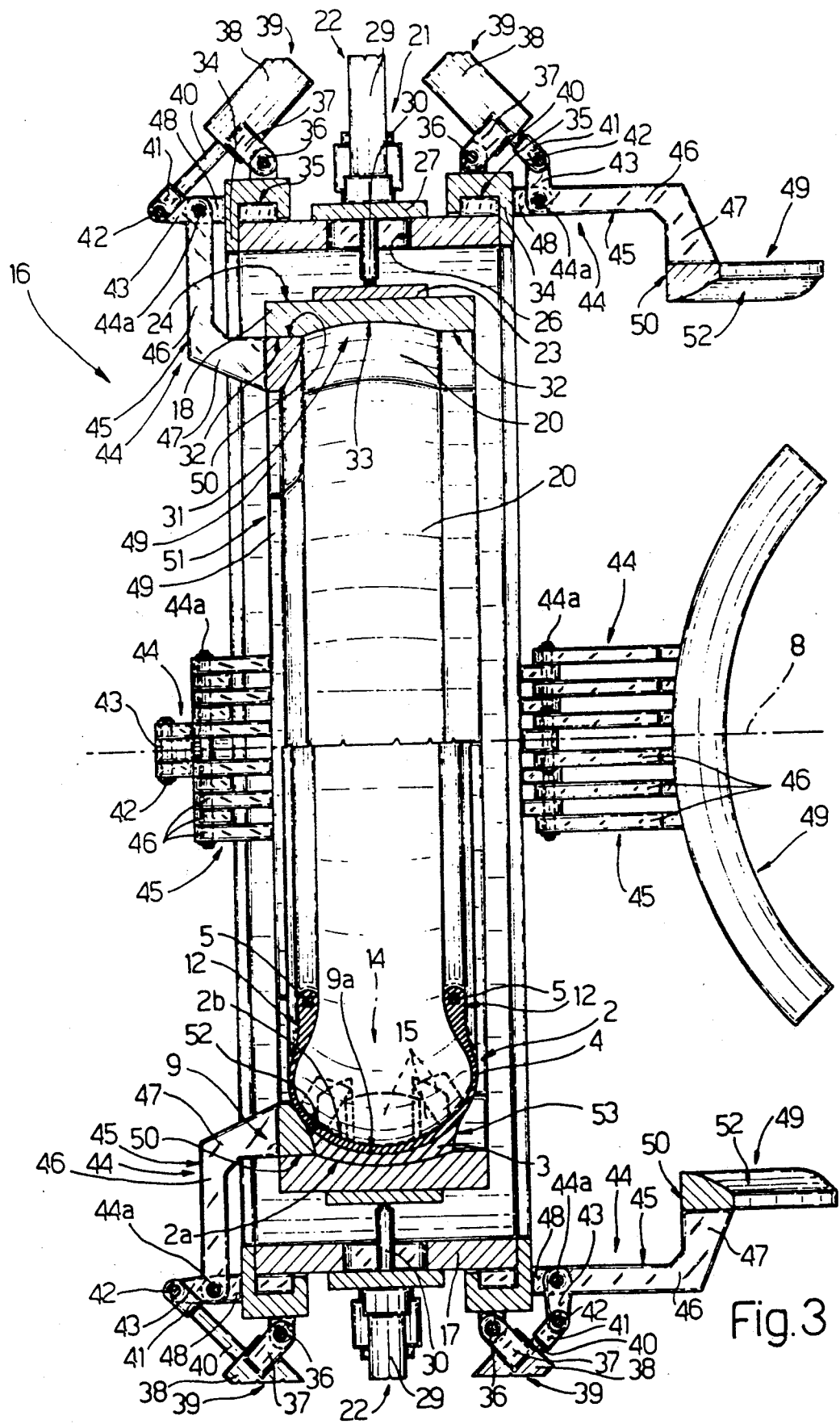
FIG. 3 shows a larger-scale section taken along line III—III in FIG. 2.

As shown in FIG. 3, each sector 20 includes an inner surface 31 having two end portions 32 in the form of a flat cylindrical sector; and an intermediate portion 33 having a concave cross section with its concave side facing radially inwardly. In particular, the shape of intermediate portion 33 negatively matches that assumed by the outer surface of tread belt 3 of a finished smooth-tread tire of the same size as grab ring 16. Grab ring 16 also includes two rings 34, each fitted in a removable manner onto a respective end of outer annular body 17 and releasably connected to same by means of a respective bayonet joint 35.

By means of respective pins 36, perpendicular to axis 8 and substantially tangent to the outer surface of ring 34, each ring 34 is fitted with a number of equally-spaced levers 37, each having a fixed angular position about the axis of respective pin 36. Each lever 37 is inclined outwardly in relation to respective ring 34, and is fitted integrally on its free end with the body 38 of a pneumatic actuator 39, perpendicular to lever 37, having an output rod 40 located axially outside respective ring 34 and facing axis 8. The outer end portion of rod 40 consists of a fork 41 pivoting at 42 on the free end of a first arm 43 of a square rocker arm 44, the second arm 45 of which, perpendicular to arm 44, consists of a number of parallel rods 46, each having an end portion 47 bent square and parallel to arm 43.

At 44a, where arms 43 and 45 join, each rocker arm 44 pivots on the end of a respective appendix 48 extending axially outwards from respective ring 34 at the connecting point of respective lever 37, so as to rotate in relation to appendix 48 about an axis parallel to pin 36. Portions 47 of rods 46, of each rocker arm 44, are connected at their outer ends to the intermediate portions of respective circular, substantially triangular-section sectors 49 having substantially cylindrical base surfaces 50 facing appendix 48 and of substantially the same radii as end portions 32 of surface 31.

Each sector 49 rotates, in relation to respective appendix 48, between a raised idle position wherein sector 49 is located outside surface 31, and a lowered operating position wherein its base surface 50 contacts respective end portion 32 of two adjacent sectors 20, and its opposite ends substantially contact the respective ends of adjacent sectors 49, so as to define an annular shoulder 51, the inner surface 52 of which negatively matches the shape assumed by the outer surface of shoulder 53 of a finished smooth-tread tire of the same size as grab ring 16.

The two annular shoulders 51 and inner annular body 18 define stitching mold 9, and the two surfaces 52 and portion 33 of surface 31 define a concave annular stitching surface 9a negatively matching the shape of surface 2a.

In use, as on a normal tire building system, such as that described in U.S. Pat. No. 4,877,468, which is incorporated herein in the interest of full disclosure, carcass 4 of tire 2 is built in a known manner on building drum 6, while at the same time tread belt 3, consisting in a known manner of a tread reinforced with inner tread plies, is formed on a further known tread building drum (not shown) usually of the radially collapsible type.

At this point, grab ring 16, in the idle position with sectors 20 retracted outwardly out and sectors 49 raised, is moved into position over and coaxial with tread belt 3. Sectors 20 are then moved inwardly into the operating position engaging the outer surface of tread belt 3, and said further tread building drum (not shown) is collapsed radially to free tread belt 3, which at this point can be moved by grab ring 16 and transferred in a known manner onto building drum 6 prior to the completion, on drum 6, of the final building stage of carcass 4.

In fact, before said final assembly stage is completed, grab ring 16 is moved into position coaxial with axis 8 and outside carcass 4, and sectors 49 are lowered into the operating position so as to define both said two shoulders 51 and, together with sectors 20 in the operating position, mold 9 and respective stitching surface 9a.

At this point, carcass 4 is expanded so as to adhere its outer surface to the inner surface of tread belt 3 and to surfaces 52, and tire 2 is stitched on the inside, as described in said previously noted co-pending Italian Patent Application No. T091A000211 and No. T091A000212, so as to form tire 2 precisely against surface 9a. Once stitched inside, tire 2 is freed from drum 6 and removed and later unloaded by grab ring 16 by raising sectors 49 and extracting sectors 20.

Figure 4:
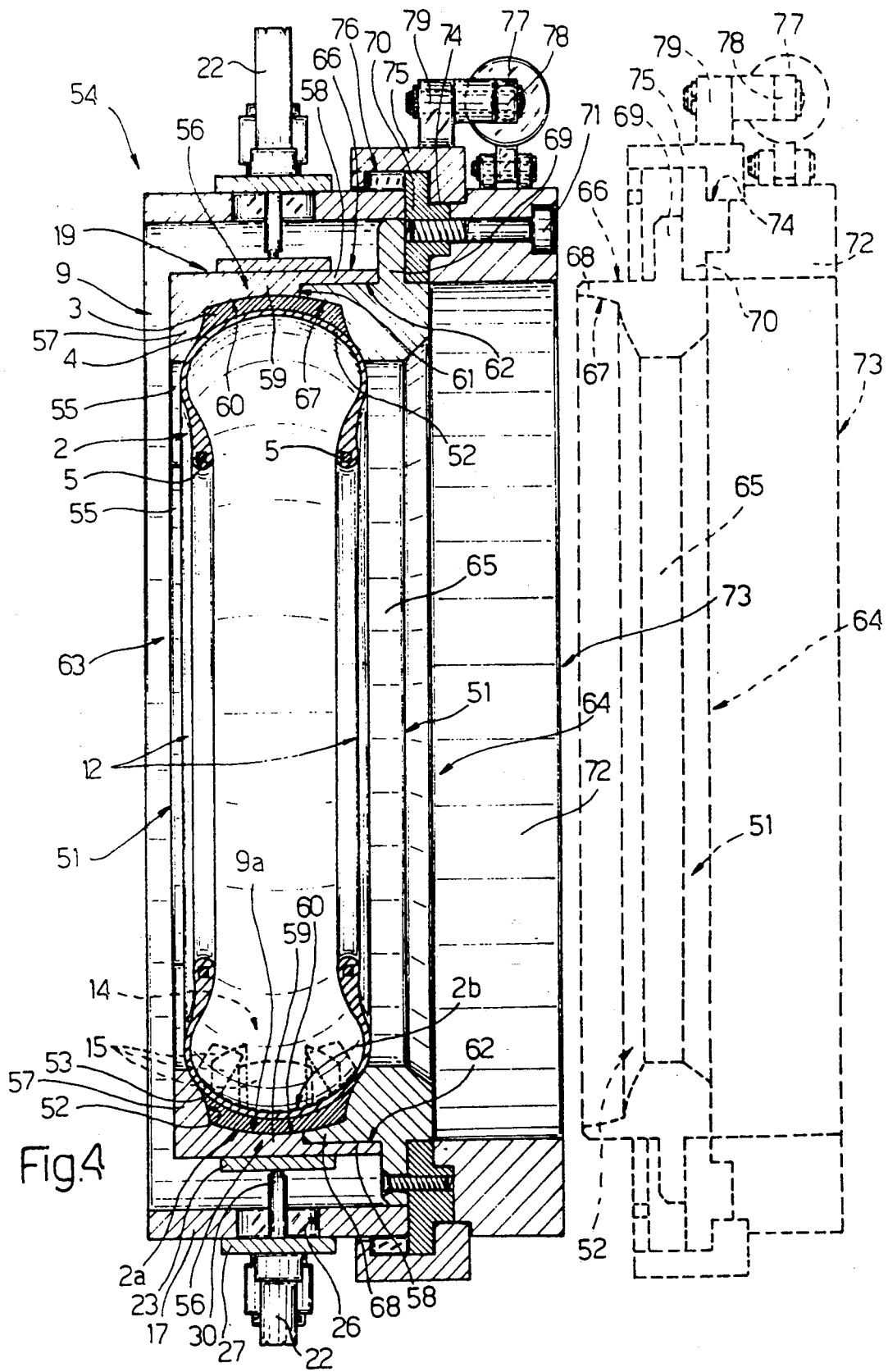
FIG. 4 shows an axial section, similar to that of FIG. 3, of a second preferred embodiment of the FIG. 1 stitching mold.

The FIG. 4 embodiment relates to a grab ring 54, the parts of which that are common to grab ring 16 using the same numerals. Grab ring 54 differs from grab ring 16 in regard to the design of the inner annular body and annular shoulders (numbered 18 and 51 respectively on grab ring 16). Grab ring 54 includes an outer annular body 17 supporting a number of sectors 55 by means of respective connecting and guide devices (not shown) similar to devices 21 and connected to sectors 55 for connecting them to outer annular body 17 and guiding them, in relation to same, as they are moved radially, by actuator 22, between an outer idle and inner operating position.

Each sector 55 includes a substantially L-shaped section having a first portion parallel to axis 8 and constituting the section of a substantially cylindrical, annular sector 56; and a second portion constituting the section of an annular shoulder sector 57. Annular sectors 57 present substantially the same cross section as sectors 49 (FIG. 3) of grab ring 16, and also define a first annular shoulder 51 when sectors 55 are in the inner operating position. Similarly, when sectors 55 are in the inner operating position, annular sectors 56 define an inner annular body 19 similar to that of grab ring 16.

Each sector 55 includes a cylindrical annular outer plate 58 integral at one end with a respective annular sector 56. Plate 58 extends over substantially the entire width of tire 2, and presents, along its inner surface and on the side integral with respective annular section 56, a thicker portion 59 defined internally by a concave surface 60 corresponding with a transverse portion of corresponding intermediate portion 33 (FIG. 2) of surface 31 of inner annular body 18 of grab ring 16. Surface 60 blends, on one side, with inner surface 52 of sector 57 and, on the other, by means of shoulder 61, with inner surface 62 of the portion of plate 58 projecting transversely beyond portion 59.

In the inner operating position shown in FIG. 4, sectors 55 define an annular half mold 63 connected axially to a second annular half mold 64 so as to define stitching mold 9. Annular half mold 64 includes a rigid ring 65 defined externally by a cylindrical surface 66 of the same diameter as surface 62, and internally, on the side facing half mold 63, by a first annular surface 67 combining with surface 60 to form portion 33 of surface 31, and by a second shoulder surface 52 laterally defining an inner portion of ring 65 consisting of a second annular shoulder 51 opposite the first shoulder 51 defined by sectors 57. Surfaces 66 and 67 define an annular appendix 68 which is positioned contacting inner surface 62 of cylindrical annular plate 58, with its free end contacting shoulder 61.

Ring 65 includes an intermediate outer annular flange 69 having an outside diameter equal to the inside diameter of outer annular body 17, and which, when appendix 68 is positioned contacting shoulder 61, is positioned laterally contacting one end of annular plate 58. The portion of surface 66 extending laterally outwardly from flange 69 is fitted with a ring 70 having an outside diameter greater than that of outer annular body 17, arranged laterally contacting one end of outer annular body 17, and fitted, by means of screws 71, with a second ring 72 on the end opposite that facing outer annular body 17. Rings 70 and 72 form an annular base 73 for half mold 64 and define, along their outer surface, an annular groove 74 engaged in a rotary manner by an outer ring 75 forming the mobile part of a bayonet joint 76 connecting half molds 63 and 64.

Ring 75 is rotated between an open and closed position by a pneumatic actuator 77 connected to the outer lateral surface of base 73 and having an output rod 78 directed tangentially in relation to base 73 and connected to ring 75 by a bracket 79. When bayonet joint 76 is closed, both surfaces 52 and surfaces 60 and 67 combine to define stitching surface 9a of mold 9.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

We claim:

1. A tire innerstitching mold, characterized by the fact that it comprises an annular gripping body for receiving and retaining an outer tread belt; and two annular shoulders located on opposite sides of said annular gripping body and defining, with same, a concave annular stitching surface negatively matching the outer shoulder and tread surface of a finished smooth-tread green tire; at least one of said two annular shoulders being movable in relation to said annular gripping body.

2. A stitching mold as claimed in claim 1, characterized by the fact that said annular gripping body and said annular shoulders form an inner portion of a grab ring for both transferring said outer tread belt to the building drum of a respective tire carcass, and for removing from said drum said finished green tire.

3. A stitching mold as claimed in claim 2, characterized by the fact that said annular gripping body forms the inner annular body of said grab ring, which also includes an outer annular body coaxial with and supporting said inner annular body.

4. A stitching mold as claimed in claim 3, characterized by the fact that said inner annular body includes a number of annular sectors, as well as actuating and guide means located between each of said annular sectors and said outer annular body for moving said annular sectors between an outer idle position and an inner operating position wherein the ends of said annular sectors are mutually contacting.

5. A stitching mold as claimed in claim 4, characterized by the fact that both of said shoulders are movable in relation to said inner annular body.

6. A stitching mold as claimed in claim 5, characterized by the fact that each of said shoulders includes a number of annular shoulder sectors supported by said outer annular body; and actuating means for moving said annular shoulder sectors between a raised idle position, wherein said annular shoulder sectors are located outside said inner annular body, and a lowered operating position, wherein said annular shoulder sectors are located inside said inner annular body with their ends mutually contacting.

7. A stitching mold as claimed in claim 4, characterized by the fact that one of said annular shoulders is integral with said inner annular body, while the other said annular shoulder is movable in relation to said inner annular body.

8. A stitching mold as claimed in claim 7, characterized by the fact that said other annular shoulder is defined by a rigid ring coaxial with said inner annular body; releasable joint means axially connecting said inner annular body and said rigid ring.

* * * * *